US006581979B2

(12) United States Patent
Ikegami et al.

(10) Patent No.: US 6,581,979 B2
(45) Date of Patent: Jun. 24, 2003

(54) JOINT FOR SPIRAL PIPE AND CONNECTING METHOD

(75) Inventors: Hiroshi Ikegami, Osaka (JP); Masatoshi Takashima, Osaka (JP)

(73) Assignee: Totaku Industries, Inc., Takatsuki (JP)

( * ) Notice: Subject to any disclaimer, the term of this patent is extended or adjusted under 35 U.S.C. 154(b) by 54 days.

(21) Appl. No.: 09/848,230

(22) Filed: May 4, 2001

(65) Prior Publication Data
US 2002/0158468 A1 Oct. 31, 2002

(30) Foreign Application Priority Data
May 8, 2000 (JP) ........................... 2000-134970

(51) Int. Cl.$^7$ ................................. F16L 33/00
(52) U.S. Cl. ................ 285/256; 285/903; 285/259
(58) Field of Search ................ 285/903, 256, 285/259, 255, 242

(56) References Cited

FOREIGN PATENT DOCUMENTS

| FR | 2502735 A | | 10/1982 | |
|---|---|---|---|---|
| GB | 2104992 A | | 3/1983 | |
| SU | 0896309 | * | 1/1982 | ............... 285/903 |

* cited by examiner

Primary Examiner—Lynne H. Browne
Assistant Examiner—G M Collins
(74) Attorney, Agent, or Firm—McGinn & Gibb, PLLC

(57) ABSTRACT

The spiral pipe joint comprises a nipple 1, a caulking ring 2 and a flexible string-shaped pressure contact member 3. After an inserting portion 11 of the nipple 1 is inserted into a pipe body P, the pressure contact member 3 is wound once or more times around the outer peripheral surface of the pipe body P existing above the inserting portion 11, and the caulking ring 2 is placed on the outside of the thus wound pressure contact member 3 and is compressed in the center direction of the pipe body P to thereby reduce the diameter of the caulking ring 2 in such a manner that the caulking amount thereof on the small-diameter stepped portion 13 is larger than the step level difference between the inserting portion 11 and small-diameter stepped portion 13.

20 Claims, 8 Drawing Sheets

JOINT FOR SPIRAL PIPE AND CONNECTING METHOD

BACKGROUND OF THE INVENTION

1. Field of the Invention

The present invention relates to a joint which is mounted on the end portion of a spiral pipe used for protection of a communication cable or a conductor cable or a spiral pipe used for transport of fluid, and is used to connect the spiral pipe to another spiral pipe or to the box body of a manhole. The present invention also relates a method of connecting a joint to a spiral pipe with an outer periphery of a pipe wall thereof formed in an uneven spiral shape.

2. Description of the Related Art

In related art, as shown in FIG. 13 which is a side surface section view of a spiral pipe joint when it is mounted on a spiral pipe, the spiral pipe joint includes a nipple 1a and a caulking ring 2a. The nipple 1a is to be inserted into the end portion of a pipe body P of the spiral pipe and provides a joint main body. The caulking ring 2a fixes the pipe body P to the nipple 1a. The nipple 1a includes a flange portion 12a, an inserting portion 11a, and a group of annular projections 13a. The flange portion 12a is formed of metal in substantially a cylindrical shape and is formed in the end portion of the nipple 1a. The inserting portion 11a is to be inserted into the pipe body P. Each of the group of annular projections 13a is disposed on the outer surface of the inserting portion 11a. The axial-direction section of the group of annular projections 13a is substantially a saw-tooth shape having an acute angle with respect to the end portion at opposite side of the flange portion 12a. On the other hand, the caulking ring 2a is formed of metal in a cylindrical shape and has a dimension, which allows the caulking ring 2a to be fitted with the outer peripheral surface of the pipe body P. Specifically, after the inserting portion 11a of the nipple 1a is inserted into the pipe body P, the caulking ring 2 is placed on the outer peripheral surface of the pipe body P and is compressed and deformed toward the nipple 1a, thereby fixing and connecting together the nipple 1a and pipe body P. Then, the pipe body P is deformed by the caulking ring 2a and is thereby reduced in diameter. The inner wall surface of the pipe body P is filled into the recessed portions of the annular projections 13a formed on the outer surface of the inserting portion 11a of the nipple 1a, whereby, the connecting portion between the nipple 1a and pipe body P can be made airtight. Further, even in case where there is applied to the nipple 1a a force to pull out the pipe body P from the nipple 1a, the pipe body P is caught by the annular projections 13a to compete with the pull-out force and thus the pipe body P can be prevented against removal.

However, in the above-mentioned spiral pipe joint of the related art, in case where the pipe body P of the spiral pipe is small in thickness, due to the step level difference between the projected and recessed portions of the annular projections, the inner surface of the spiral pipe is easy to break. In case where the caulking force by the caulking ring 2a is weakened in order to avoid such breakage of the spiral pipe inner surface, the spiral pipe can be removed from the nipple 1a. That is, in the above-mentioned spiral pipe joint in the related art, there is still left a problem that it is very difficult to eliminate both of the spiral pipe inner surface breakage and spiral pipe slippage at the same time by adjusting the caulking force.

SUMMARY OF THE INVENTION

The present invention aims at eliminating the above drawbacks found in the spiral pipe joint of the related art. Accordingly, it is an object of the invention to provide a joint for a spiral pipe which can simplify the structure of a joint main body, does not need to change the operation to mount itself onto a spiral pipe, and can not only prevent the inner surface of the spiral pipe against breakage but also prevent the spiral pipe against removal. It is another object of the invention to provide a method of connecting a joint to a spiral pipe with an outer periphery of a pipe wall thereof formed in an uneven spiral shape.

Now, using reference characters used in an embodiment of the invention illustrated herein, description will be given below the structure of the invention, which is provided for attaining the above object. A joint for a spiral pipe with the outer periphery of the pipe wall thereof formed in an uneven spiral shape, according to the invention, comprises: a nipple 1 which is to be inserted into the end portion of a pipe body P and forms a main body of the joint; a caulking ring 2 for fixing the pipe body P to the nipple 1; and, a flexible string-shaped pressure contact member 3 which is to be fitted into a spiral groove formed in the outer peripheral surface of the pipe P. The nipple 1 is formed of metal in a cylindrical shape; and, it includes a flange portion 12 formed in one end portion thereof, an inserting portion 11 to be inserted into the pipe body P, and a small-diameter stepped portion 13 formed in the inserting portion 11 on the flange portion 12 side thereof. The caulking ring 2 is formed of metal in a cylindrical shape having such an inside diameter that allows the caulking ring 2 to be fitted with the outer peripheral surface of the pipe body P. In the present joint, after the inserting portion 11 of the nipple 1 is inserted into the pipe body P, the pressure contact member 3 is wound once or more times around the outer peripheral surface of the portion of the pipe body P that exists above the inserting portion 11, and the caulking ring 2 is placed on the outside of the thus wound pressure contact member 3 in a radial direction of the pipe body P and is compressed in the center direction of the pipe body P to thereby reduce the diameter of the caulking ring 2 in such a manner that the caulking amount thereof on the small-diameter stepped portion 13 is larger than the step level difference between the inserting portion 11 and small-diameter stepped portion 13, whereby the nipple 1 and pipe body P can be fixed and connected to each other.

DETAILED DESCRIPTION OF THE PREFERRED EMBODIMENT

Figure 1:
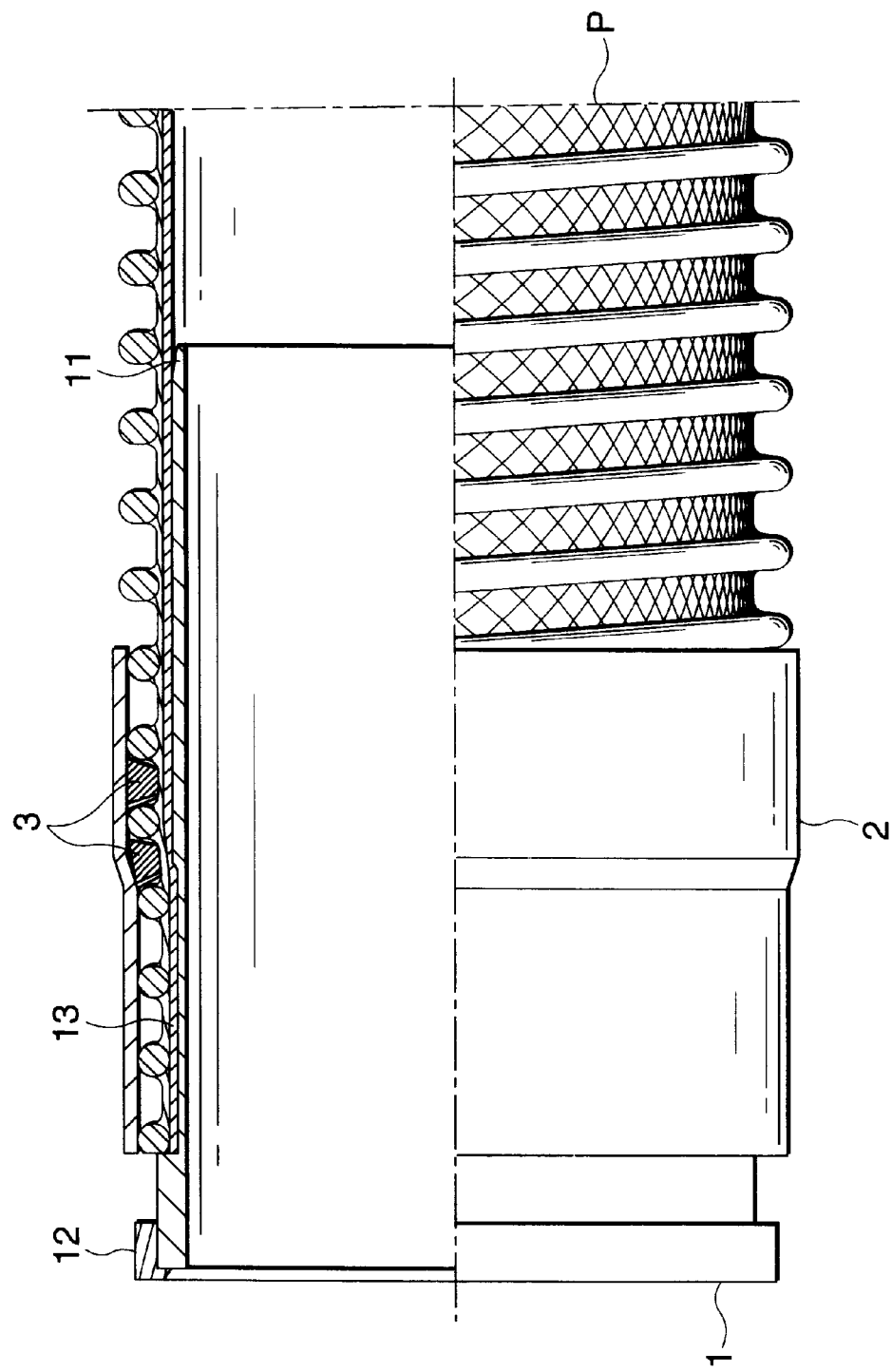
FIG. 1 is a side surface half section view of a joint according to a first embodiment of the invention, showing a state thereof in which it is mounted on a spiral pipe.
Figure 2:
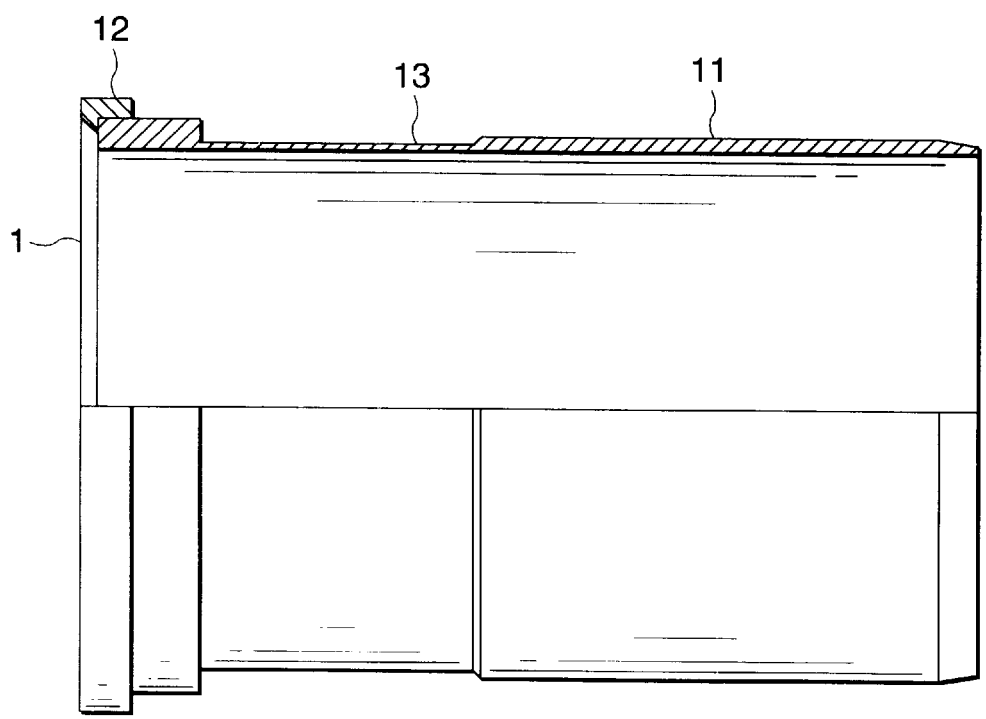
FIG. 2 is a side surface half section view of a nipple employed in the first embodiment.
Figure 3:
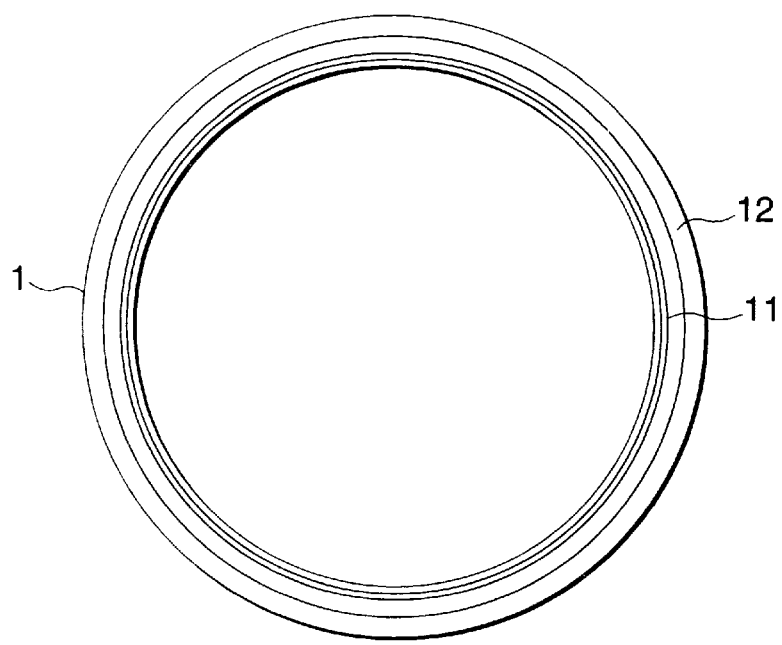
FIG. 3 is a back view of the nipple.
Figure 4:
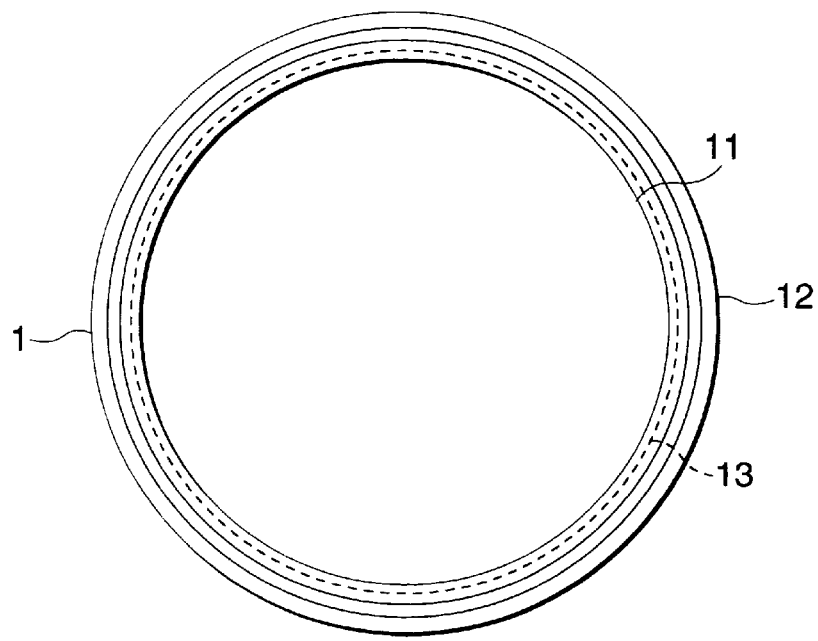
FIG. 4 is a front view of the nipple.
Figure 5:
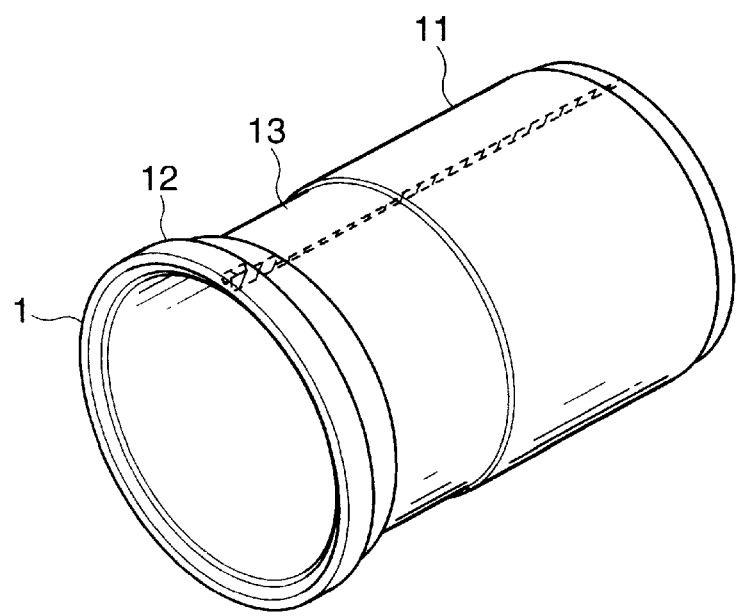
FIG. 5 is a perspective view of the nipple.
Figure 6:
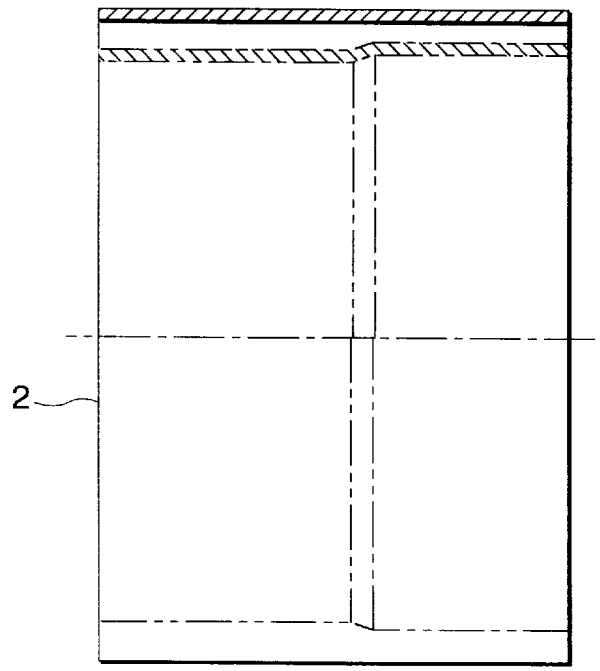
FIG. 6 is a side surface half section view of a caulking ring employed in the first embodiment.
Figure 7:
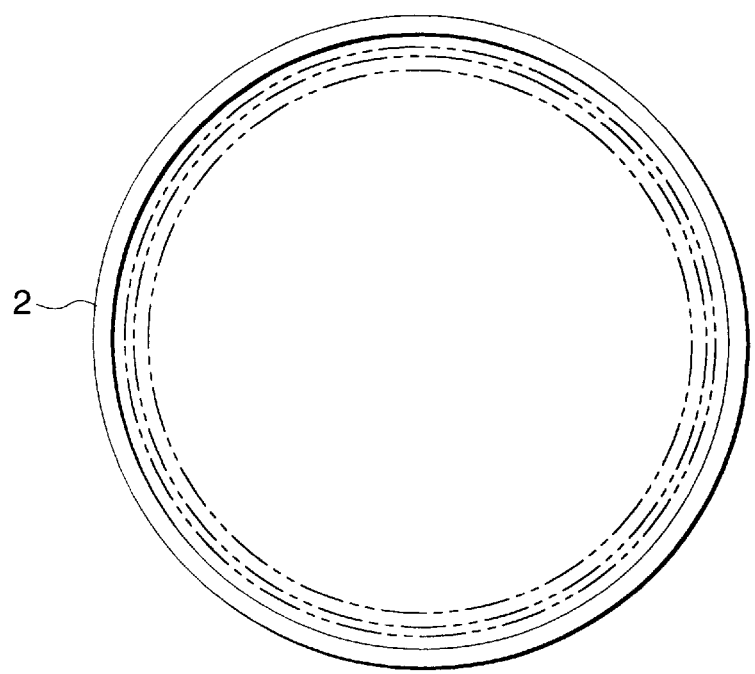
FIG. 7 is a front view of the caulking ring shown in FIG. 6.
Figure 8:
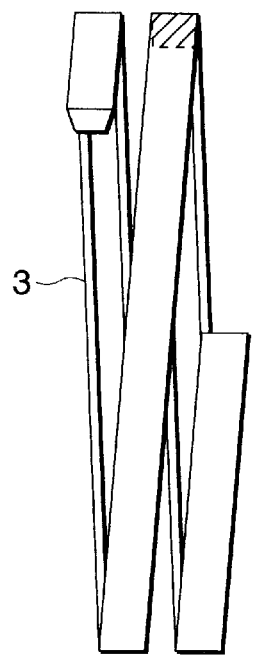
FIG. 8 is a front view of a pressure contact member employed in the first embodiment.
Figure 9:
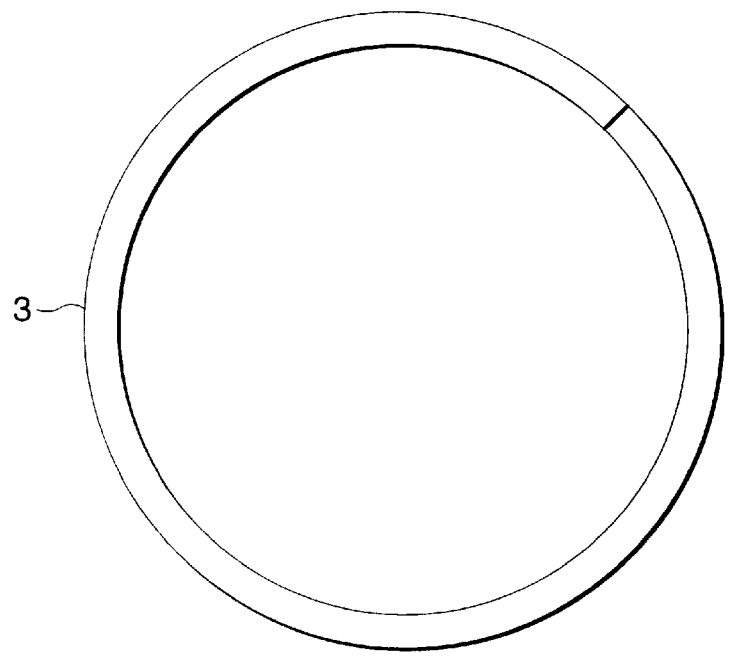
FIG. 9 is a front view of the pressure contact member shown in FIG. 8.

Now, description will be given below of a preferred embodiment of a joint according to the invention with reference to the accompanying drawings. FIG. 1 is a side surface half section view of a joint according to a first embodiment of the invention, showing a state thereof in which it is mounted on a spiral pipe. FIGS. 2 to 5 are a side surface half section view of a nipple employed in the first embodiment, a back view thereof, a front view thereof and a perspective view thereof, respectively. Also, FIGS. 6 and 7 are respectively aside surface half section view of a caulking ring employed in the first embodiment and a front view thereof. Further, FIGS. 8 and 9 are respectively a side view of a pressure contact member employed in the first embodiment and a front view thereof.

In FIG. 1, a joint according to the present invention includes a nipple 1, a caulking ring 2 and a pressure contact member 3. The nipple 1 includes a flange portion 12, an inserting portion 11, and a small-diameter stepped portion 13. The invention is structured in the above-mentioned manner and, in enforcing the invention, the nipple 1, as in the nipple of the related art, may be made of a pipe member, which is formed of carbon steel (SS). The basic shape of the nipple 1 is generally the same as the nipple of the related art. The outside diameter of the inserting portion 11, which is the characteristic of the invention, may be set to the standards of a spiral pipe to be connected by the joint. The outer peripheral surface of the nipple 1 is formed in a flat cylindrical surface and, in the position of the cylindrical surface that is near to the flange portion 12, there is formed the small-diameter stepped portion 13. The step level difference of the small-diameter stepped portion 13 is set so as to obtain a fixing force, which can stand a tensile force applied to the spiral pipe to thereby prevent the spiral pipe against removal. And, therefore, the invention can be used almost regardless of the nominal diameter of the spiral pipe to be connected by the invention and, generally, when the invention is used for a spiral pipe having a nominal diameter in the range of 120 mm to 300 mm, the step level difference of the small-diameter stepped portion 13 may be set of the order of 1 to 2 mm. And, the outer periphery of the end face of the stepped portion where the small-diameter stepped portion 13 is in transit to the large-diameter portion of the inserting portion 11, preferably, may be chamfered. The reason for this is to be able to prevent the inner wall of the spiral pipe from being broken on the present end face. Also, from the viewpoint of prevention of the pipe body P against damage and removal, most preferably, the winding portion of the pipe body P to be wound by the pressure contact member 3 may be the outer peripheral portion of the portion of the pipe body P that exists above the inserting portion 11 and near to the small-diameter stepped portion 13, that is, the pressure contact member 3 is wound on a portion of the outer peripheral surface of the pipe body P near to a portion inside of which the small-diameter stepped portion 13 is disposed.

The caulking ring 2 is a metal pipe which is formed of the same material as the nipple 1, while the inside diameter of the caulking ring 2 is set according to the standards of a spiral pipe to be connected by the joint, that is, almost equal to or slightly larger than the maximum outside diameter of the spiral pipe. The thickness of the caulking ring 2, preferably, may be set equal to or slightly smaller than the thickness of the nipple 1. Next, in the case of the flexible string-shaped pressure contact member 3 to be fitted into the spiral groove formed in the outer peripheral surface of the pipe body P, the section of the pressure contact member 3 may have any shape, for example, a circular shape, an elliptical shape, a rectangular shape, or a trapezoidal shape. Preferably, however, the section may have a shape of such a dimensional width that it can be embedded into the section of the spiral groove or may have a shape of such a dimensional width slightly larger than the width of the spiral groove section, while the longitudinal dimension of the section of the pressure contact member 3 may be set equal to or larger than the depth of the spiral groove. For the pressure contact member 3, actually, there can be used a ready-made member such as a V belt: that is, the pressure contact member 3 is readily available simply by cutting the V belt to a desired length.

To connect the pipe body P and the present joint to each other, the pipe body P may have been previously inserted into the caulking ring 2; and, after the inserting portion 11 of the nipple 1 is inserted into the pipe body P, the pressure contact member 3 may be wound on the spiral groove formed in the outer peripheral surface of the pipe body P at least once or more times, preferably, one and half times or twice or more, the caulking ring 2 is placed on the outside of the thus wound pressure contact member 3 in a radial direction of the pipe body and is then pressurized and compressed toward the center of the pipe body P. In this case, the caulking amount on the portion of the caulking ring 2 corresponding to the small-diameter stepped portion 13 is increased to be larger than the step level difference between the small-diameter stepped portion 13 and inserting portion 11, so that the inner surface of the pipe body P of the spiral pipe is able to receive the compressive force more strongly in the outer peripheral portion of the small-diameter stepped portion 13 than in the outer peripheral portion of the inserting portion 11. After caulked, the spiral projection of the outer peripheral surface of the pipe body P receives the strong compressive force and is thereby compressed and deformed; and, especially, the spiral projection of the portion of the pipe body P corresponding to the inserting portion 13 is contacted closely and strongly with the outer peripheral surface of the small-diameter stepped portion 13 due to the compressively deforming force greater than the step level difference between the small-diameter stepped portion 13 and inserting portion 11, thereby being able to keep the sealing performance between the nipple 1 and the inside and outside of the pipe body P.

According to the above-mentioned spiral pipe joint, when compared with the spiral pipe joint in the related art, since the inner surface of the pipe body P of the spiral pipe is pressure contacted with the simple cylindrical surface of the outer surface of the inserting portion 11 including the small-diameter stepped portion 13, even in case where the pressure contact force is increased, there is eliminated a fear that, as in the spiral pipe joint of the related art, the projected portions of the annular projections 13a can receive the locally concentrated unreasonable force and thus the pipe body P can be broken; that is, the durability of the spiral pipe joint can be enhanced. Also, not only the tensile force acting on the pipe body is received by the transition portion of the inserting portion 11 to the small-diameter stepped portion 13 but also the pressure contact force between the inserting portion 11 and the inner surface of the pipe body P can be increased sufficiently, whereby there can be obtained a strong fixed and connected condition between the joint and pipe body P. Also, as the pressure contact member 3, it is not necessary to use such molded products that are specially produced for specific sizes but a ready-made member such as a V belt can be used regardless of the size of the spiral pipe, so that the outside and inside of the spiral pipe can be highly sealed simply and at a low cost. Further, since the nipple 1 may be formed in such a manner that only the small-diameter stepped portion 13 can be formed therein; that is, the contents of the manufacturing operation of the spiral pipe joint are almost the same as to those of the spiral pipe joint in the related art and thus do not require a special skill. Therefore, the joint including the nipple 1 can be manufactured at a low cost.

Figure 10:
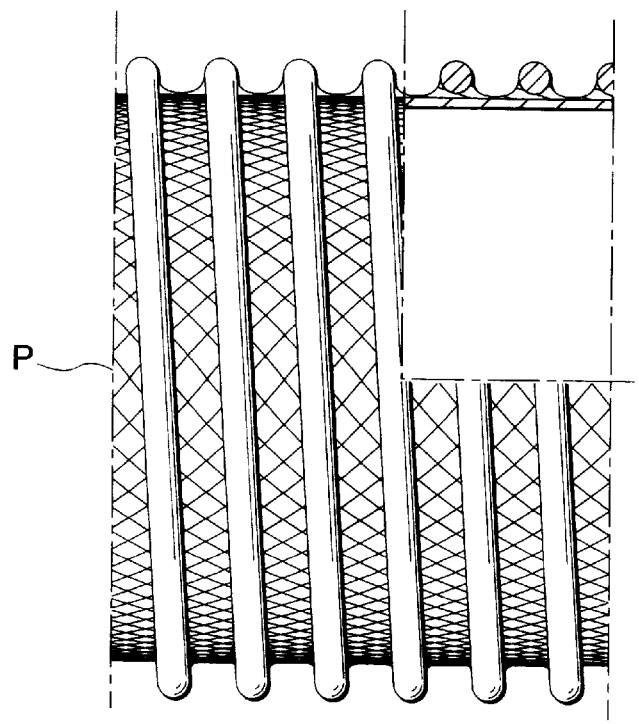
FIG. 10 is a partially half section view of the side surface of a pipe body of a spiral pipe.
Figure 11:
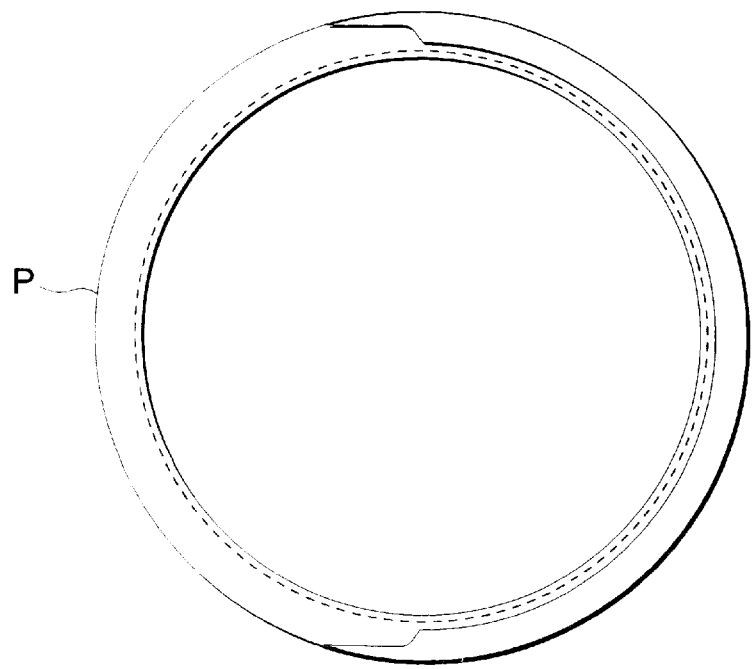
FIG. 11 is a front view of the pipe body shown in FIG. 10.
Figure 12:
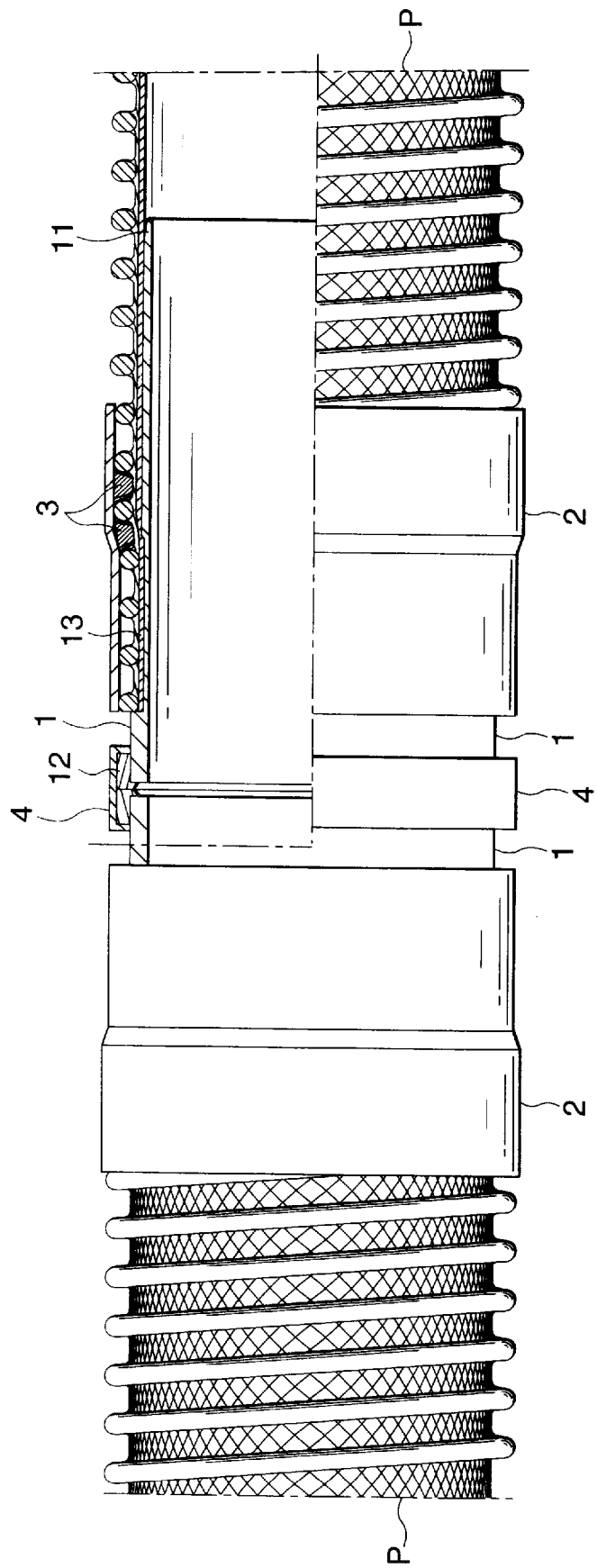
FIG. 12 is an explanatory view of the side surface of a spiral pipe, showing how the spiral pipe is connected by the joint.
Figure 13:
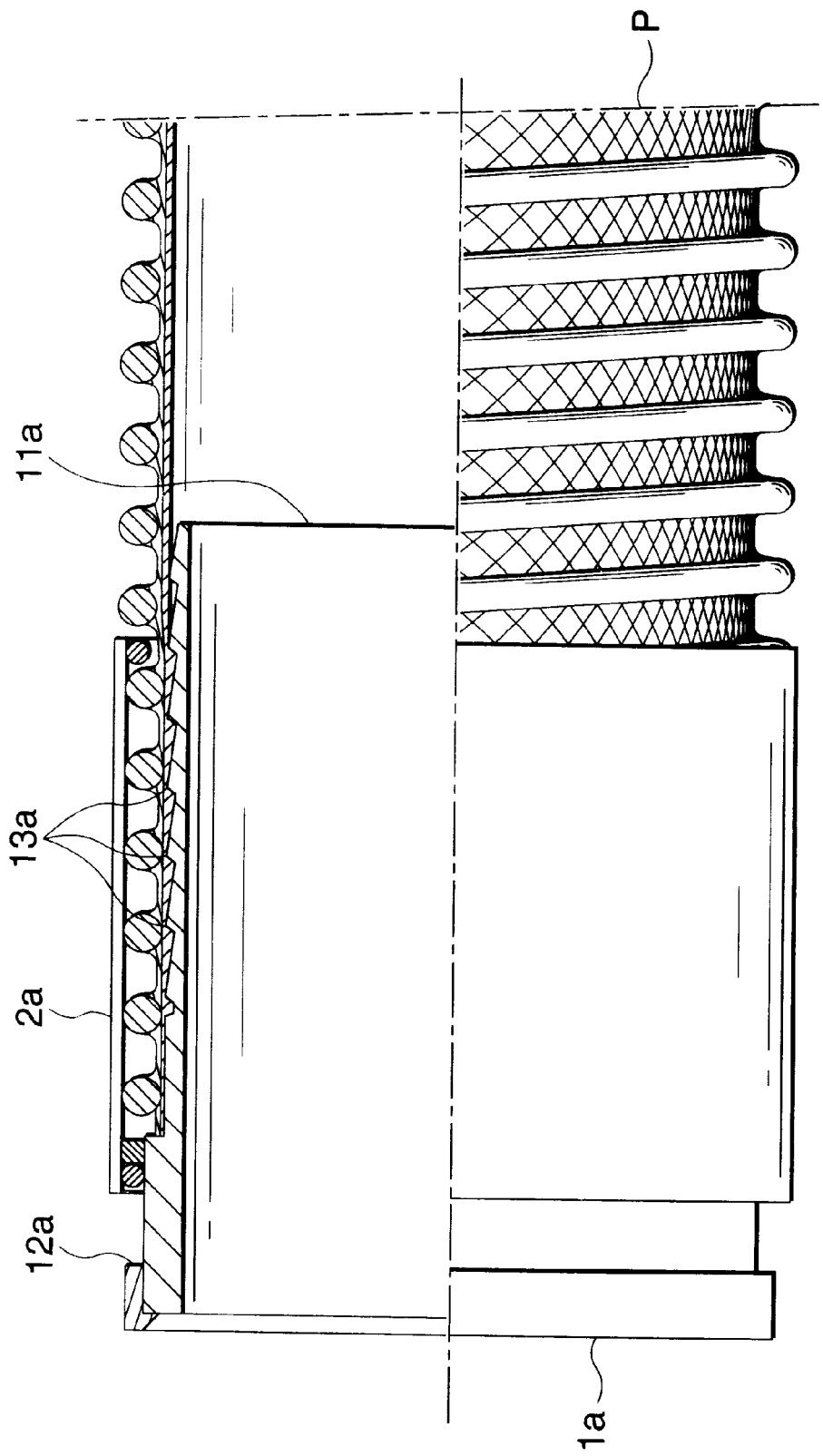
FIG. 13 is a side surface half section view of a joint in the related art, showing a state thereof in which it is mounted on a spiral pipe.

A joint according to a first embodiment is used to connect a spiral pipe having a size of φ200. The diameter of the inserting portion 11 of the nipple 1 of the joint is around 203.5 mm, while the small-diameter stepped portion 13 thereof is formed smaller by 1.5 mm in diameter than the inserting portion 11. The transition portion of the nipple 1 from the small-diameter stepped portion 13 to the inserting portion 11 is chamfered by 1.5 mm. The joint is formed of SS (carbon steel). In operation, the inserting portion of the nipple 1 is inserted into the pipe body P, a pressure contact member 3 using a generally used V belt, as shown in FIG. 1, is wound one and half times around a spiral groove formed in the outer peripheral portion of the pipe body P that exists above the inserting portion 11 of the nipple 1 and near to the small-diameter stepped portion 13 thereof. Then the caulking ring 2 is placed on the thus wound pressure contact member 3 from above. Next, pressure is applied to the caulking ring 2 from the periphery thereof in the center direction of the pipe body P to reduce the diameter of the pipe body P, thereby caulking and fixing the pipe body P to the nipple 1. The caulking amount in this caulking operation, according to the present embodiment, is set as follows: above the outer peripheral portion of the inserting portion 11, the diameter of the pipe body P can be reduced by around 3.0 mm and, above the outer peripheral portion of the small-diameter stepped portion 13, the diameter of the pipe body P is reduced by around 5.0 mm; that is, the diameter of the pipe body P is reduced more greatly in the portion thereof existing above the small-diameter stepped portion 13 than the step level difference between the insert portion 11 and the small-diameter stepped portion 13. Here, FIGS. 6 and 7 respectively show the original state of the caulking ring 2 and, in these figures, the caulked state of the caulking ring 2 is shown by an imaginary line. And, FIGS. 10 and 11 respectively show the structure of the pipe body P of the spiral pipe and the outer appearance thereof, while FIG. 12 shows how the pipe body P is connected by the joint. In operation, two pipe bodies P and P respectively having the joints 1, 1 mounted to the end portions are disposed opposed to each other, the joints 1, 1 are joined to each other with an annular-shaped flat plate packing between them, and the flange portions 12, 12 are connected together with a connecting ring 4. In the present embodiment, there is shown a spiral pipe having a pressure resistant structure using reinforcing nets; however, of course, the invention can also apply to a hose having an ordinary pipe body structure.

Although description has been given heretofore of the embodiment that can be believed to be representative of the invention, the invention is not always limited only to the illustrated embodiment, but it can also be enforced by other various embodiments, provided that they can satisfy the above-mentioned requirements of the invention, can attain the above-mentioned object of the invention, and can provide the following effects of the invention.

As can be seen clearly from the foregoing description, a joint for a spiral pipe, according to the invention, differently from the spiral pipe joint of the related art in which there are formed a group of annular-shaped projections each having a saw-tooth-shaped section, is structured such that the inner surface of the pipe body of the spiral pipe is pressure contacted with the simple cylindrical surface of the inserting portion of the nipple including the small-diameter stepped portion thereof. Thanks to this, even in case where the pressure contact force is set sufficiently large, there is eliminated a fear that, as in the spiral pipe joint of the related art, the tensile force can be concentrated locally in the projected portions of the annular-shaped projections each having a saw-tooth-shaped section and thus the pipe body can be broken due to the unreasonable concentration of the tensile force; that is, the durability of the spiral pipe can be enhanced greatly. Also, when the pipe body is caulked to the nipple using the caulking ring, the caulking amount on the small-diameter stepped portion is set larger than the step level difference between the inserting portion and the small-diameter stepped portion. Thanks to this, the tensile force acting on the pipe body is overcome not only by the pressure contact force between the inner surface of the pipe body and the outer peripheral surface of the inserting portion of the nipple but also by the combined force, which consists of the strong pressure contact force with respect to the outer peripheral surface of the small-diameter stepped portion and the receiving force of the stepped surface portion of the small-diameter stepped portion where the small-diameter stepped portion is in transit to the inserting portion. Therefore, there can be obtained strong connection between the spiral pipe joint and pipe body, which in turn can provide a large removal preventive effect as well as a watertight effect between them. Further, since the pressure contact member is wound around the outer peripheral surface of the pipe body and the outer periphery of the thus wound pressure contact member is caulked using the caulking ring, even in case where the pipe body is a pipe body into which, as in the present embodiment, reinforcing nets are embedded, the pressure contact member can be pressed against the outer peripheral surfaces of the reinforcing nets, thereby being able to prevent the reinforcing nets from being cut. Especially, because the pipe body is compressed and pressure contacted with the nipple by applying pressure to the caulking ring to reduce the diameter thereof, there is eliminated a phenomenon that the initial caulking pressure can be loosened with the passage of time, so that the initial caulking force can be maintained for a long period of time. This can provide an excellent effect that the spiral pipe joint can be used with a sense of security.

Further, since the nipple has a simple structure that only the cylindrical-shaped small-diameter stepped portion is formed in the inserting portion thereof to be inserted into the pipe body, the nipple can be manufactured at a low cost. Also, because the pressure contact member is wound around the pipe body along the spiral groove of the pipe body, it is not necessary to prepare moldings, that is, pressure contact members which are specially produced according to the specific sizes of the pipe bodies different in diameter from one another. Thus, for example, since it is possible to use a ready-made string-shaped member such as a V belt, not only the connection of the spiral pipe joint to the end portion of the spiral pipe can be achieved at a low cost and with ease, but also the high sealing property of the joint with respect to both of the outer and inner surfaces of the spiral pipe can be secured easily.

What is claimed is:

1. A joint for a spiral pipe with an outer periphery of a pipe wall thereof formed in an uneven spiral shape, said joint comprising:
   a cylindrical-shaped nipple including a flange portion formed in one end portion thereof, an inserting portion to be inserted into a pipe body of the spiral pipe, and a small-diameter stepped portion formed in said inserting portion on said flange portion side thereof;
   a pressure contact member to be wound at least one time around an outer peripheral surface of the pipe body, inside of which said inserting portion is disposed, and be fitted into a spiral groove formed in the outer peripheral surface of said pipe body; and
   a cylindrical-shaped compressible caulking ring having such an inside diameter that allows said compressible caulking ring to be fitted with the outer peripheral surface of the pipe body and fixing the pipe body to said nipple, said compressible caulking ring being placed on an outside of said wound pressure contact member in a radial direction of the pipe body and being compressed in a center direction of the pipe body so that caulking amount thereof on said small-diameter stepped portion is larger than a step level difference between said inserting portion and said small-diameter stepped portion.

2. The joint as set forth in claim 1, wherein said nipple and said compressible caulking ring are formed of metal.

3. The joint as set forth in claim 1, wherein said pressure contact member comprises a flexible string-shaped member having a trapezoidal-shaped section, a circular-shaped section, an elliptical-shaped section, or a rectangular-shaped section.

4. The joint as set forth in claim 1, wherein said pressure contact member comprises a flexible string-shaped member having a section with a shape of such a dimensional width slightly larger than the width of the spiral groove of the pipe body and a dimensional length equal to or larger than the depth of the spiral groove.

5. The joint as set forth in claim 1, wherein said pressure contact member comprises a flexible string-shaped member having a section with a shape of such a dimensional width that it can be embedded into the section of the spiral groove of the pipe body and a dimensional length equal to or larger than the depth of the spiral groove.

6. The spiral pipe joint as set forth in claim 1, wherein said pressure contact member is wound on a portion of the outer peripheral surface of the pipe body near to a portion inside of which said small-diameter stepped portion is disposed.

7. The spiral pipe joint as set forth in claim 1, wherein a peripheral edge portion of an end face of a boundary portion where said small diameter stepped portion is in transit to a large-diameter portion of said inserting portion is chamfered.

8. A method of connecting a joint to a spiral pipe with an outer periphery of a pipe wall thereof formed in an uneven spiral shape, the joint having: a cylindrical-shaped nipple including a flange portion formed in one end portion thereof, an inserting portion to be inserted into a pipe body, and a small-diameter stepped portion formed in the inserting portion on the flange portion side thereof; a pressure contact member to be fitted into a spiral groove formed in an outer peripheral surface of the pipe body; and a cylindrical-shaped compressible caulking ring to be fitted with an outer peripheral surface of the pipe body and fixing the pipe body to the nipple, the method comprising:
   inserting the pipe body into the caulking ring;
   inserting the inserting portion of the nipple into the pipe body;
   winding the pressure contact member at least one time around the outer peripheral surface of the pipe body, inside of which the inserting portion is disposed;
   placing the compressible caulking ring on an outside of the wound pressure contact member in a radial direction of the pipe body; and
   compressing the compressible caulking ring in a center direction of the pipe body so that a caulking amount of the compressible caulking ring on the small-diameter stepped portion is larger than a step level difference between the inserting portion and the small-diameter stepped portion.

9. The method as set forth in claim 8, wherein the pressure contact member is wound on a portion of the outer peripheral surface of the pipe body near to a portion inside of which the small-diameter stepped portion is disposed.

10. The joint according to claim 1, wherein said caulking ring provides a compressive force more strongly in an outer peripheral portion of said small-diameter stepped portion than in the outer peripheral portion of said inserting portion.

11. The joint according to claim 1, wherein said pressure contact member is substantially string-shaped.

12. The joint according to claim 1, wherein said pressure contact member is substantially flush with a top surface of said spiral groove.

13. The joint according to claim 1, wherein said pressure contact member comprises a flexible material.

14. The joint according to claim 1, wherein said flange portion is substantially adjacent to an outer peripheral surface of said nipple.

15. The joint according to claim 1, wherein an inside diameter of said caulking ring is substantially equal to or larger than a maximum diameter of said spiral pipe.

16. The joint according to claim 1, wherein a thickness of said caulking ring is equal to or smaller than a thickness of said nipple.

17. The joint according to claim 1, wherein an inner surface of said spiral pipe is in pressure contact with an outer surface of said inserting portion including said small-diameter stepped portion.

18. The method according to claim 8, further comprising:
   chamfering a peripheral edge portion of an end face of a boundary portion where said small-diameter stepped portion is transiting to a large-diameter portion of said inserting portion.

19. The method according to claim 8, further comprising:
   producing a compressive force more strongly in an outer peripheral portion of said small-diameter stepped portion than in the outer peripheral portion of said inserting portion.

20. The method according to claim 8, wherein said pressure contact member is substantially string-shaped.

* * * * *